Dec. 10, 1957     S. W. COLLINS     2,815,934
APPARATUS FOR CORE DRILLING WELLS
Filed June 26, 1952     3 Sheets-Sheet 1

INVENTOR.
Samuel W. Collins.
BY
ATTORNEYS

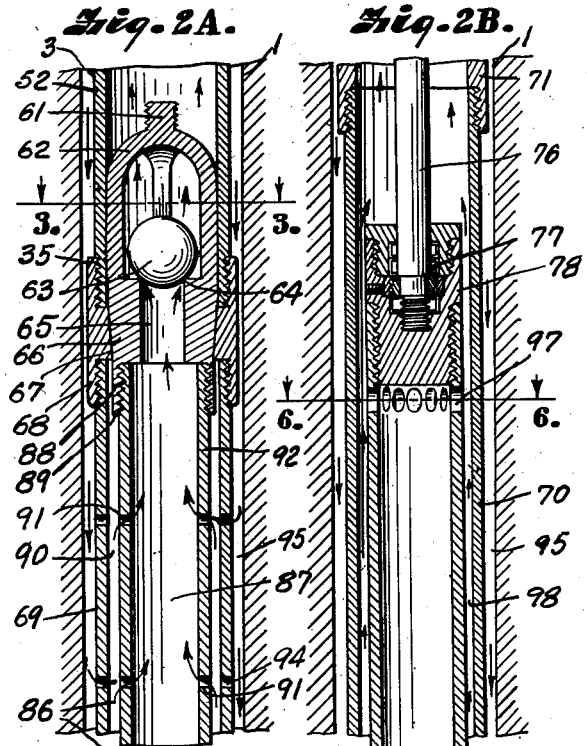
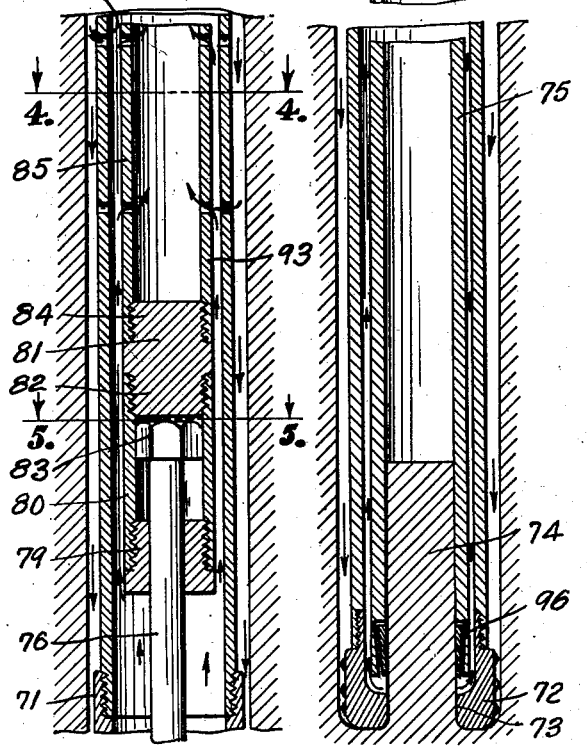
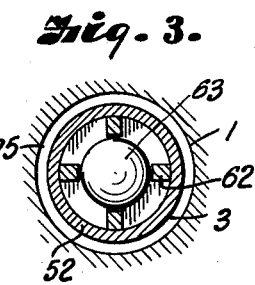
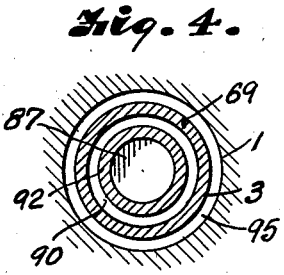
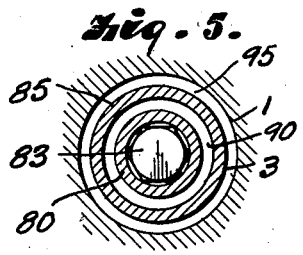
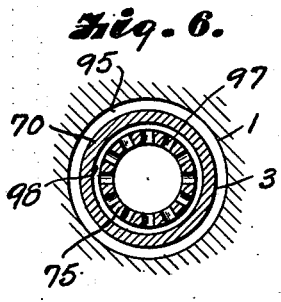
INVENTOR.
Samuel W. Collins.
ATTORNEYS.

Dec. 10, 1957    S. W. COLLINS    2,815,934
APPARATUS FOR CORE DRILLING WELLS
Filed June 26, 1952    3 Sheets-Sheet 3
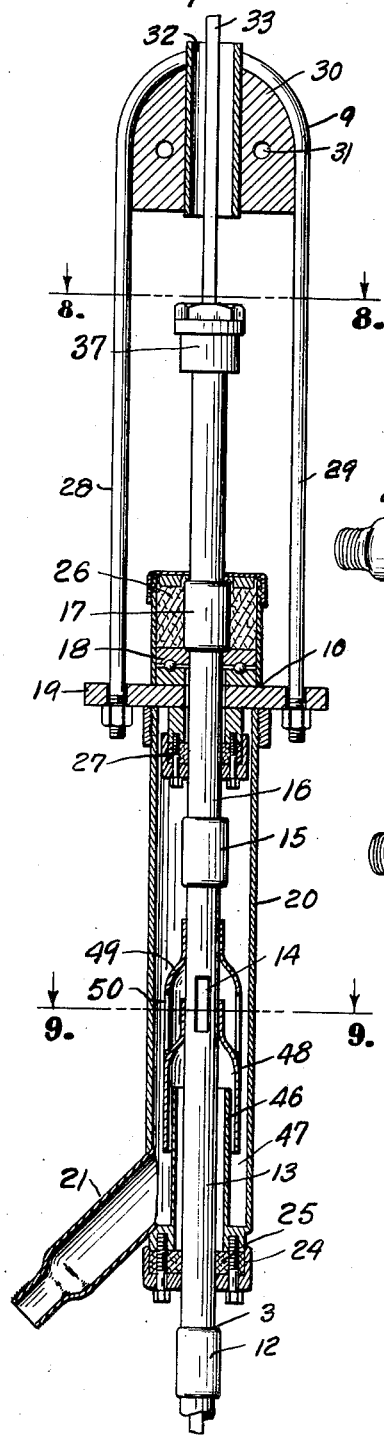
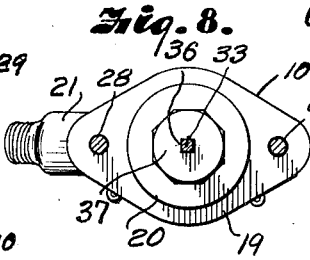
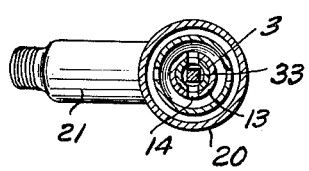
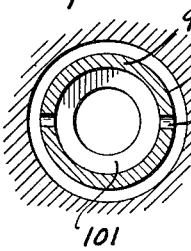
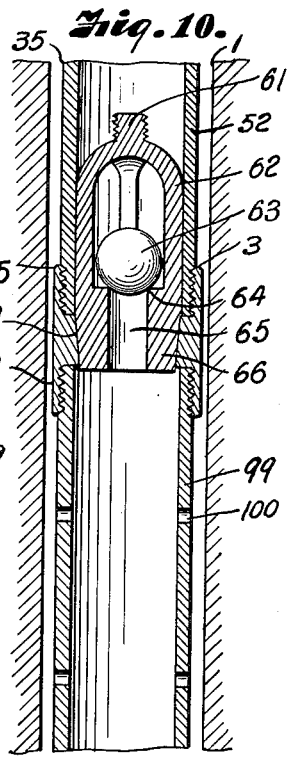
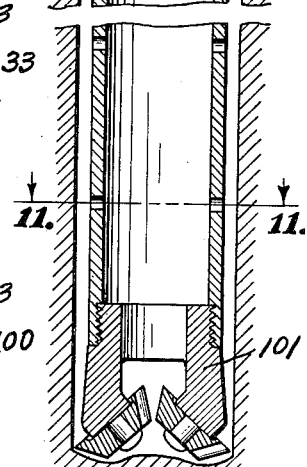
INVENTOR.
Samuel W. Collins.
BY
Fishburn & Mullendore
ATTORNEYS.

United States Patent Office 2,815,934
Patented Dec. 10, 1957

2,815,934

APPARATUS FOR CORE DRILLING WELLS

Samuel W. Collins, Tulsa, Okla.

Application June 26, 1952, Serial No. 295,721

2 Claims. (Cl. 255—72)

This invention relates to an apparatus for cleaning, drilling and core drilling wells with a controlled hydrostatic pressure of the drilling fluid within the well.

As disclosed in my co-pending application, Serial No. 669,309, now matured into Patent No. 2,605,083, I have provided for sub-circulation of the drilling fluid with a pressure merely sufficient to remove the cuttings made by a drill bit, the low pressure being maintained by a sucker rod operated pump which elevates the drilling fluid along with the cuttings to the top of the well.

Apparatus of this character is desirable to prevent pressures on the wall of the borehole that may seal off a producing formation or result in holding back the formation fluids. However, because of the low pressure circulation it is difficult to maintain proper density of the fluid and prevent settling out of the cuttings or other materials to be removed; consequently, velocity of the fluid is not sufficient to carry the materials to the top of the well and the pump becomes clogged or "sanded up."

It is therefore the principal purpose of the present invention to provide an apparatus for maintaining a substantially constant density and uniform suspension of the material within the fluid that is pumped to the top of the well.

Other objects of the invention are to provide an apparatus for maintaining the cuttings and/or materials in constant movement or agitation for preventing settling thereof in the various flow passageways between the drill bit and pump that is associated therewith; to provide a simple mixing chamber that is adapted to be connected between the drill bit or core barrel as the case may be and the pump; and to provide a mixing chamber having inlet openings for admitting drilling fluid from the borehole in various amounts between the drill bit or core barrel and the pump and provide the proper density of the fluid necessary in elevating the cuttings at the required velocity.

Other objects of the invention are to provide an improved swivel head through which the pumped drilling fluid is discharged from the rotary drill pipe into a settling tank where the cuttings settle out and the fluid is returned to the borehole; and to provide a swivel head having a driving connection with the string of sucker rods which operate the pump so as to rotate the sucker rods with the drill pipe and thereby prevent unscrewing of the rods or pump connections.

In accomplishing these and other objects of the invention, I have provided an improved apparatus the preferred forms of which are illustrated in the accompanying drawings wherein:

Fig. 2A is a similar section of the lower portion of the pump barrel and the tubular mixing chamber in which the cuttings are kept in agitation and mixed with additional fluid to control density of the fluid elevated by the pump.

Fig. 2B is a similar section of a core barrel that is connected with the lower end of the mixing chamber.

Fig. 3 is a cross section on the line 3—3 of Fig. 2A.

Fig. 4 is a cross section on the line 4—4, of Fig. 2A particularly illustrating the annular flow passageways surrounding the drill pipe and mixing chamber.

Fig. 5 is a similar cross section taken at a lower point to illustrate the connection between the core barrel and the mixing chamber.

Fig. 6 is a cross section through the upper portion of the core barrel particularly illustrating the ports through which the drilling fluid in the core barrel passes around the swivel that connects the core barrel with the mixing chamber.

Fig. 7 is an enlarged longitudinal section through the swivel head.

Fig. 8 is a cross section on the line 8—8 of Fig. 7 particularly illustrating the driving connection between the drill pipe and sucker rods whereby the sucker rods are rotated with the drill pipe to prevent unscrewing thereof.

Fig. 9 is a cross section through the swivel head on the line 9—9 of Fig. 7 and showing the ports for discharging the drilling fluid and cuttings carried therewith.

Fig. 10 is a section through the lower portion of the pump and mixing chamber and showing a drill bit connected therewith for drilling or cleaning out the borehole of the well.

Fig. 11 is a cross section on the line 11—11, Fig. 10.

Figure 1:
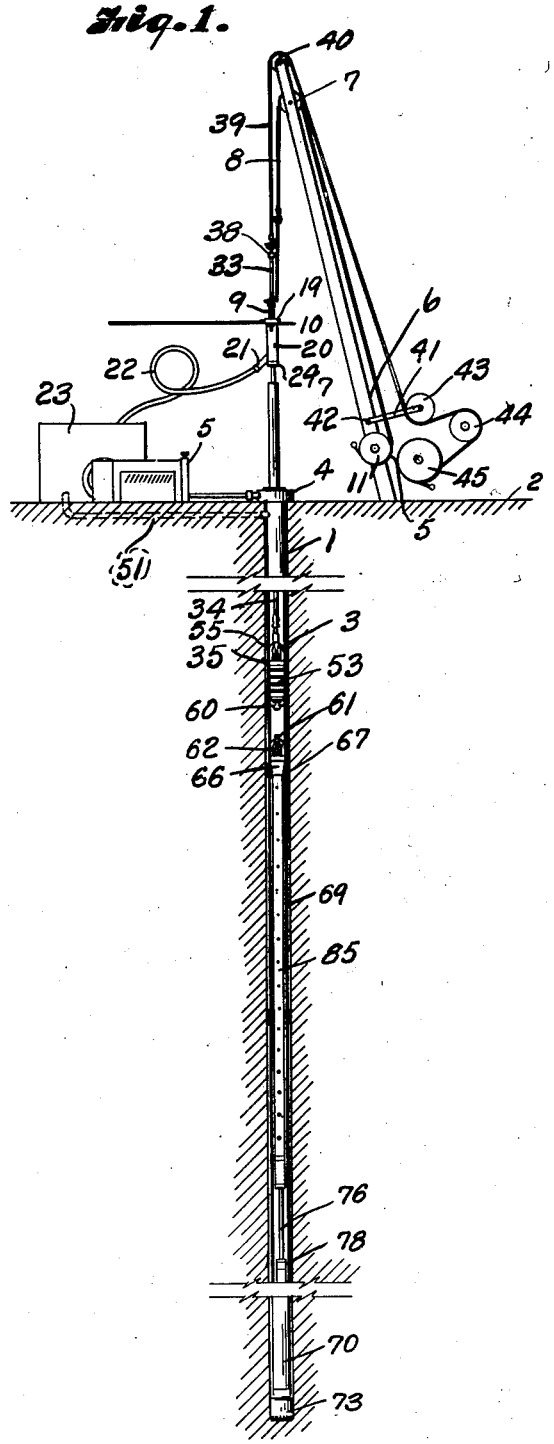
Fig. 1 is a vertical sectional view of a well equipped with a cleaning out, drilling and core apparatus embodying the features of the present invention.

Referring more in detail to the drawings:

1 designates a borehole that has been drilled from the surface 2 through various earth formations toward a producing formation which is being cleaned out, drilled and/or core drilled by an apparatus in accordance with the present invention. The apparatus includes a string of drill pipe or tubing 3 that is rotated by a turntable 4 powered from a drawworks 5 that is associated with a derrick and rod reciprocating mechanism 6 later to be described.

The drill pipe is supported from a crown pulley 7 by means of a cable 8 that connects with a bail 9 of a swivel head 10 attached to the upper end of the drill pipe. The other end of the cable is wound on a winding drum 11 which may be rotated from the drawworks to raise and lower the drill pipe in the borehole in accordance with drilling practice.

The drill pipe or tubing 3 is made up of a plurality of tubular sections connected together by tool joints or couplings 12. Connected with the uppermost section of drill pipe is an extension 13 having slots 14 through which drilling fluid is discharged from the drill pipe as later described. The section 13 is connected by a coupling 15 with a swivel section 16 carrying a collar 17 that is supported on an annular antifriction bearing 18 carried on a cross head 19. The crosshead 19 extends through a tubular shell 20 which receives the drilling fluid discharged from the slots 14 and discharges it through an outlet connection 21 and a flexible duct 22 to a settling tank 23. The lower end of the shell 20 carries a stuffing box 24 that contains a packing 25 which seals about the rotary pipe section 13 to prevent leakage of the drilling fluid about the drill pipe. The upper end of the shell 20 encloses the bearing 18 and contains a packing 26 that forms a seal with the collar 17. A seal is also provided about the swivel section 16 at a point below the crosshead 19 as indicated at 27 to prevent leakage of the drilling fluid and to protect the antifriction bearing 18 especially when the settling tank is above the level of the swivel head.

The bail 9 has legs 28 and 29 that carry the crosshead 19 and mounted within the loop portion of the bail is a block 30 having openings 31 for attaching the cable 8. The block 30 also includes a tubular guide 32 for passing a polish rod 33 on the upper end of a string of sucker rods 34 that extend downwardly through the drill pipe for operating a pump 35 later to be described.

The polish rod 33 is of suitable cross section to form a driving connection with a correspondingly shaped opening 36 in a stuffing box 37 that is attached to the uppermost section of drill pipe as shown in Fig. 7. Therefore, when the drill pipe 3 is rotated by the turntable 4 the string of sucker rods 34 will turn therewith to prevent unthreading of the sucker rod connections. The upper end of the polish rod 33 carries a swivel 38 that is connected with a cable 39 operating over a sheave 40 on the upper end of the derrick. The cable 39 is operated to effect reciprocation of the sucker rods within the drill pipe by means of a pumping arm 41 that is pivotally attached as at 42 to the derrick. The outer end of the pump arm carries a pulley 43 cooperating with a fixed pulley 44 to guide the cable on a winding drum 45 which lowers the sucker rods as the borehole is deepened. The pump arm 41 is actuated on the derrick by any suitable mechanism (not shown) to pull on the cable 39 for raising the sucker rods and to lower the sucker rods for effecting operation of the pump 35.

In order to divert the drilling fluid discharged through the slots 14, the shell 20 of the swivel head has an internal upwardly extending tubular nipple 46 which loosely encircles the drill pipe section 13 and which cooperates with the shell 20 in providing an annular passageway 47 connected with the outlet connection 21. Extending over the upper end of the tubular nipple 46 is a cap 48 having a skirt portion encircling the upper end of the sleeve nipple 46. The skirt portion of the cap terminates below the slots 14 so that the drilling fluid discharged through the openings passes through the annular passageway 47 for discharge through the outlet 21. To effect downward deflection of the drilling fluid, the slots 14 are covered by a deflector 49 having slots 50.

After the cuttings have settled out in the tank 23, the drilling fluid is returned to the borehole through a duct 51 for downward flow around the drill pipe at a rate to provide a hydrostatic head exteriorly of the drill pipe only sufficient to maintain a supply of drilling fluid and without exerting a high hydrostatic pressure on the formation being drilled.

The pump 35 includes a barrel 52 that is connected between lower sections of drill pipe and contains a piston 53 having an axial flow passageway 54 therethrough to pass drilling fluid from below the piston through the cage 55 of a working valve 56 that engages a seat encircling the upper end of the flow passageway 54 when the piston moves upwardly within the pump barrel on the upstroke of the sucker rods. The cage 55 has a threaded terminal 57 that connects with the box 58 of the lower sucker rod section. The bottom end of the piston has an internally threaded axial opening 59 in a spider 60 that is adapted to be connected with an upstanding externally threaded stud 61 on a cage 62 for a standing valve 63. The cage 62 of the standing valve has a seat 64 encircling an axial flow opening 65 that is formed in a tapered portion 66 of the cage which seats within a tapered seat 67 in a coupling 68 that connects the lower end of the pump barrel 52 with a tubular section 69 that in turn connects with a lower tubular section 70 by means of a coupling 71. The tubular sections 69 and 70 form a continuation of the drill pipe and a suitable drill bit 72 is connected with the lower end thereof for drilling the formation.

Figure 2:
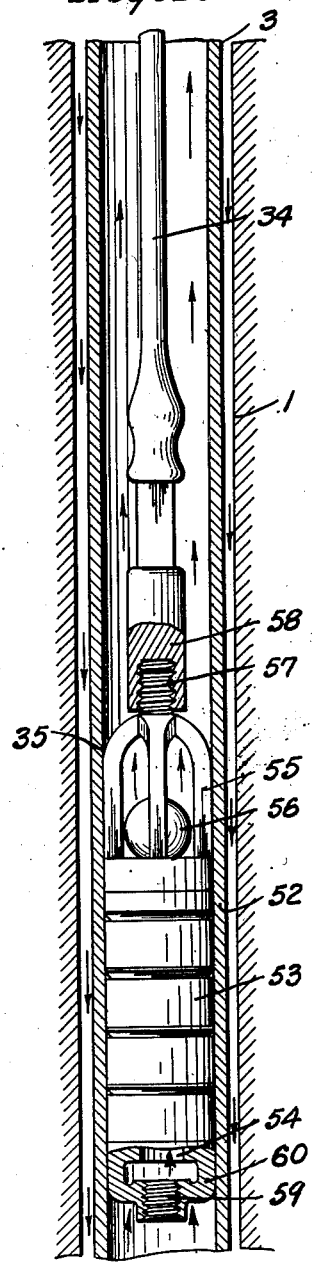
Fig. 2 is an enlarged vertical section through the upper portion of the pump barrel which forms a part of the rotary drill pipe and illustrating flow of the drilling fluid by means of arrows.

In the form illustrated in Fig. 2B, the drill bit 72 is of a type for making a core of the formation being drilled. The bit, therefore, has an axial passageway 73 for passing a core 74 therethrough into a core barrel 75 that is suspended within the drill pipe section 70 from a rod 76. The rod 76 has a lower end thereof swivelly mounted as at 77 in a head 78 of the core barrel. The upper end of the rod extends through a bushing 79 that is threaded into the lower end of a nipple 80 which in turn is connected with a fitting 81. The fitting 81 has a lower threaded neck 82 for attaching the upper internally threaded end of the nipple 80 so as to cooperate with the bushing 79 in forming an enclosure for a head 83 of the rod 76.

Threadedly connected with the externally threaded upper end 84 of the fitting 81 is a pipe 85 of smaller outer diameter than the inner diameter of the pipe section 69 to provide an upflow passageway 86 therebetween. The pipe 85 forms an elongated mixing chamber 87 and has a threaded upper end 88 engaged in the internally threaded collar 89 that depends from the standing valve cage 62 so that the core barrel 75 is connected with the standing valve cage 62 and whereby the core barrel 75 may be removed through the pump barrel 52 when the piston 53 of the pump is connected with the threaded neck 61 of the standing valve cage 62 for removal upon withdrawal of the sucker rods from the rotary tubing.

The tubing or pipe 85 forming the mixing chamber 87 is of smaller diameter than the inner diameter of the outer tubing section 69 to provide an annular upflow passageway 90 therebetween for upflow of the drilling fluid and cuttings incidental to the suction effected on the upstroke to the pump piston. The tubing 85 forming the mixing chamber 87 is provided with a plurality of openings 91. The openings 91 at the upper end 92 are of relatively small diameter while the openings at the lower end 93 are of larger diameter with the intermediate openings being graduated in size from the largest to the smaller openings, so as to control inlet of the drilling fluid along the length of the mixing chamber when the piston of the pump moves upwardly to draw the fluid into the working barrel through the cage of the standing valve. The combined effective port area of all of the openings is preferably substantially equal to the capacity of the inlet port 65 of the standing valve cage 62 so that flow is effected through all of the openings of the mixing chamber and in proportion to the relative size thereof.

In order that a portion of the drilling fluid exteriorly of the drill pipe may be supplied to the mixing chamber to control the density of the drilling fluid the outer tubing section 69 is provided with openings 94 to admit the drilling fluid from the downflow passageway 95 exteriorly of the drill pipe into the annular upflow passageway 90 surrounding the mixing chamber.

The lower end of the core barrel 75 contains the usual core catcher 96 that is caused to engage the core upon downward movement of the core barrel with respect to the tubing section 70 and to lift the core therewith when the core barrel is withdrawn through the drill pipe by way of the pump barrel. The upper end of the core barrel 75 has openings 97 whereby any fluid trapped within the core barrel is discharged to the upflow passageway 98 that is provided between the core barrel 75 and the tubing section 70 as shown in Fig. 2B.

In the form of the invention shown in Fig. 10, the mixing chamber 99 is threaded into the coupling 68, and a bit 101 is attached to the lower end. The drilling fluid then flows upwardly through the bit and directly through the mixing chamber 99 where it is mixed with liquid drawn through openings 100 in the wall of the chamber.

Assuming that the apparatus is constructed and assembled as described with the drilling string extending into the borehole for deepening the hole and taking a core of the formation to be drilled, the drill pipe is supported with the bit 73 resting on the bottom of the hole. If the hole is dry, a quantity of drilling fluid, water, is discharged into the borehole through the pipe 51 so that the hydrostatic head is sufficient to cause the flow through the bit and upwardly within the passageways 98 and 90 and through the apertures 91 of the mixing chamber to the inlet of the pump. The drill pipe is rotated by the turntable 4 so that the bit chips away the formation. Simultaneously with rotation of the drill pipe, the sucker rods 34 are reciprocated upon operation of the pumping arm 41. As the piston 53 moves upwardly within the pump barrel 52 the standing valve 63 opens and the drilling fluid containing the cuttings made by the bit moves with substantial velocity through the larger of the openings in the wall of the mixing chamber. Simultaneously liquid substantially free of cuttings is drawn through the openings 94 of the outer tubing section 69 and through the smaller of the openings in the mixing chamber to mix with the fluid carrying the cuttings to control the density of the fluid lifted by the pump.

When the pump piston reaches the upper limit of its stroke, the valve 63 seats and on downward movement of the piston the trapped fluid containing the cuttings lifts the valve 56 and flows into the space above the piston. Operation of the pump increases the velocity flow of the jets through the apertures of the mixing chamber so that the drilling fluid and cuttings contained therein are kept in agitation to prevent settling out of the cuttings and sanding up of the pump.

When the liquid carrying the cuttings reaches the slots 14, it is discharged therethrough and directed downwardly through the passageway 47 for flow through the connection 21, flexible duct 22 into the settling tank 23. The liquid is allowed to settle in the tank 23 and on being freed of the cuttings is returned to the borehole through the pipe 51 so as to replenish and maintain the supply of drilling fluid at the bottom of the borehole.

When the core is to be removed, the pump piston is lowered in the pump barrel till the threads 59 engage the threads of the terminal 61. The rods are then lifted in the well by winding the cable 39 on the drum 45. This movement frees the standing valve cage 62 from its seat 67 due to the lost motion connection between the head 83 on the rod 76 and the lower end of the mixing chamber. Thus the standing valve cage is unseated before the head engages the bushing 79. Continued movement lifts the core barrel carrying the core therewith as the rods are withdrawn as in conventional practice. Upon removal of the core, the core barrel, mixing chamber, standing valve and pump piston are again lowered through the drill pipe to continue the drilling.

If desired the drill pipe may be removed from the borehole and a mixing chamber 99 may be connected with the coupling 68. In this instance, the mixing chamber 99 forms a continuation of the drill pipe and an ordinary bit 101 is attached to the lower end. The cuttings made by the bit are drawn upwardly with the drilling fluid into the mixing chamber where they meet the jets of drilling fluid drawn through the openings 100. The jets through the openings 100 keep the drilling fluid and cuttings in agitation and maintain the desired viscosity so that the fluid is readily pumped without settling out of the cuttings or other material loosened by the bit.

It is obvious that the mixing chamber provides for mixing fluid which has only a small amount of drill cuttings, sand, shale, etc., with the drill cuttings, sand, shale, etc., with the drill cuttings, sand, shale, etc., which have been ground or stirred up by the drill bit in making the borehole or cleaning out thereof as the case may be. Proper viscosity of the fluid is important because if the mixture contains too many drill cuttings, etc., the pump will not give the fluid sufficient velocity to bring them to the surface and the pump will sand up, or if the mixture is too lean it will take longer to drill. However, there is a factor of safety in pumping too lean a mixture than to pump a mixture which may result in sanding up of the pump.

If for any reason the drilling operation is suspended, it is desirable to effect connection of the pump piston with the standing valve so as to unseat the standing valve and allow the drilling fluid containing the cuttings to flow back into the bottom of the borehole so that the cuttings will not settle out and sand up the pump.

What I claim and desire to secure by Letters Patent is:

1. In an apparatus for drilling a bore hole into earth formations, a drill pipe extending into the bore hole for forming an up-flow passage therein and a space in the lower portion of the bore hole for containing a supply of liquid having a hydrostatic head of less height than the depth of the bore hole to limit pressure of the liquid upon the formations at the lower portion of the bore hole, a core bit on the lower end of the drill pipe, a core barrel in the lower end of the drill pipe, a pump connected into the drill pipe at a point spaced upwardly from the core barrel, said pump having relatively fixed and reciprocable piston and barrel members for providing a pumping chamber therebetween having an inlet and an outlet, a traveling valve in the outlet, a standing valve in the inlet, a string of sucker rods reciprocable in the drill pipe and connected with the movable member of said pump to actuate the pump for sucking liquid and cuttings mixture from around the core bit upwardly to the inlet of the pumping chamber, means for connecting the movable member of the pump with the standing valve, a tube depending from the standing valve to provide a mixing chamber therein for passage of said mixture to the pump, a rod connecting the tube with the core barrel for pulling the core barrel by means of the rods when the movable member of the pump is connected with the standing valve, and said drill pipe and tube having openings in connection with said mixing chamber for passing liquid free of cuttings into the mixing chamber responsive to suction of the pump for increasing agitation of the liquid and cuttings mixture and for reducing the density of the liquid and cuttings mixture prior to flow into the pumping chamber of the pump.

2. In combination with an apparatus for core drilling a bore hole into earth formations, which apparatus includes a string of drill pipe extending into the bore hole for forming an upflow passage and a surrounding space in the lower portion of the bore hole for containing a supply of liquid having a hydrostatic head of less height than the depth of the bore hole, a core bit on the lower end of the drill pipe, a core barrel in the lower end of the drill pipe and cooperating with the drill pipe in providing an upflow bypass for drilling fluid and cuttings exteriorly of the core barrel, means for rotating the drill pipe, and means for removing drilling fluid and cuttings made by the core bit through said bypass without increasing pressure of the liquid upon the formation beyond that established by said hydrostatic head of said fluid, wherein said means for removing the drilling fluid and cuttings includes a pump barrel having upper and lower ends connected into the string of drill pipe with the lower connection at a point spaced upwardly from the core barrel to accommodate a mixing chamber in said drill pipe between the core barrel and the pump, said mixing chamber having connection with the bypass and with the lower end of the pump barrel and the connection of the upper end of the pump barrel providing for flow of the fluid and cuttings from the pump barrel into the upflow passage above the pump barrel, a piston reciprocable in the pump barrel to draw the liquid and the cuttings made by the core bit through said bypass into the mixing chamber and through the mixing chamber into the pump barrel, sucker rods for reciprocating the piston, a standing valve at the lower end of the pump barrel adapted to unseat and admit the fluid and cuttings from the mixing chamber into the pump barrel upon the upstroke of the piston and to close for trapping the liquid and cuttings mixture in the pump barrel on the downstroke of the piston, said piston having a passage for transferring the trapped mixture through the passage in the piston on the said downstroke, a working valve carried by the piston for trapping the transferred fluid above the piston to be lifted through the upflow passage upon the upstroke of the piston, and means for discharging liquid from the bore hole into the mixing chamber for increasing agitation within the mixing chamber to prevent settling-out of the cuttings and for reducing density of the mixture to facilitate flow of the mixture through the pump barrel.

References Cited in the file of this patent

UNITED STATES PATENTS

| | | |
|---|---|---|
| 682,939 | Ivens | Sept. 17, 1901 |
| 1,867,833 | Hill | July 19, 1932 |
| 2,021,184 | Hill | Nov. 19, 1935 |
| 2,485,098 | Johnson | Oct. 18, 1949 |
| 2,537,605 | Sewell | Jan. 9, 1951 |
| 2,605,083 | Collins | July 29, 1952 |
| 2,634,101 | Sloan | Apr. 7, 1953 |